(12) United States Patent  
Nowak

(10) Patent No.: US 6,817,726 B2
(45) Date of Patent: Nov. 16, 2004

(54) LIGHTING SYSTEM

(75) Inventor: David R. Nowak, Chicago, IL (US)

(73) Assignee: Illinois Tool Works Inc., Glenview, IL (US)

( * ) Notice: Subject to any disclaimer, the term of this patent is extended or adjusted under 35 U.S.C. 154(b) by 29 days.

(21) Appl. No.: 10/315,716

(22) Filed: Dec. 10, 2002

(65) Prior Publication Data

US 2003/0117789 A1 Jun. 26, 2003

Related U.S. Application Data

(60) Provisional application No. 60/339,518, filed on Dec. 11, 2001.

(51) Int. Cl.[7] .................................................. F21V 8/00
(52) U.S. Cl. ......................... 362/31; 362/309; 362/517; 362/800
(58) Field of Search ............................ 362/26, 27, 31, 362/307, 308, 330, 335, 346, 332, 511, 517, 545, 555, 800; 385/146; 349/62, 65; 116/288, 48

(56) References Cited

U.S. PATENT DOCUMENTS

| | | | | |
|---|---|---|---|---|
| 4,218,726 A | * | 8/1980 | Fukasawa et al. | 362/23 |
| 4,282,560 A | * | 8/1981 | Kringel et al. | 362/26 |
| 4,580,197 A | * | 4/1986 | Lum | 362/85 |
| 4,909,604 A | * | 3/1990 | Kobayashi et al. | 349/64 |
| 5,239,450 A | * | 8/1993 | Wall | 362/104 |
| 5,349,504 A | * | 9/1994 | Simms et al. | 362/555 |
| 5,555,160 A | * | 9/1996 | Tawara et al. | 362/31 |
| 5,586,212 A | * | 12/1996 | McConica et al. | 385/146 |
| 5,590,945 A | * | 1/1997 | Simms | 362/31 |
| 5,812,714 A | * | 9/1998 | Hulse | 385/39 |

* cited by examiner

Primary Examiner—Thomas M. Sember
Assistant Examiner—Hargobind S. Sawhney
(74) Attorney, Agent, or Firm—Mark W. Croll; Paul F. Donovan

(57) ABSTRACT

A lighting system is provided to transmit light from a light source through a prism. The prism includes a light receiving edge surface, a curved edge surface and a light exiting edge surface. The light source is positioned to transmit a beam of light through the light receiving edge surface of the prism. The prism is configured such that the beam of light travels through the prism to strike the curved edge surface. The beam of light is then reflected off of the curved edge surface such that the beam of light changes direction and continues to travel through the prism until such time as it passes through the light exiting edge surface. The lighting system is adapted to provide a substantially uniform light distribution from the light exiting edge surface.

21 Claims, 9 Drawing Sheets

LIGHTING SYSTEM

CROSS-REFERENCE TO RELATED APPLICATION

This application claims the benefit of U.S. provisional application Ser. No. 60/339,518, filed on Dec. 11, 2001.

FIELD OF THE INVENTION

This invention relates to lighting systems, and more particularly, to lighting systems for appliance products, such as, for example, vacuum cleaners, stoves, refrigerators, microwaves, toasters, coffee makers, bread makers, other kitchen and household appliances, and other similar and various other related devices.

BACKGROUND AND SUMMARY OF THE INVENTION

Most prior art lighting systems used in appliances employ incandescent bulbs, which have many design disadvantages when trying to place them in small enclosures due to their relatively large size, short usage life and high heat generation. There is a need for a lighting system that uses a small bulb, such as an LED, which has a long life, does not have high heat generation, and can project sufficient light across the expanse of the area desired to be illuminated.

Replacing incandescent bulbs with LEDs would overcome most of the problems of using incandescent bulbs in small enclosures, but LEDs generally produce a small cone of light which typically does not generate adequate illumination to satisfy the majority of lighting requirements in appliances. One of the features of the present invention is to combine one or more LEDs with a specially designed prism to produce a uniform distribution of light of sufficient intensity across a relatively large surface area.

Another feature of the present invention is to use two LEDs in combination with a specially designed prism to further increase the area of illumination. This feature is accomplished in a simple but unique manner by adding a mirror image of the original prism.

An additional feature of the present invention is to utilize a unique complex lens to focus an LED's beam of light in a manner that keeps the light focused down the length of the prism to reduce the amount of light that bounces or reflects off of the prism's two parallel plate surfaces. A further feature is to include in the complex lens a spherical end portion that redirects light onto a curved surface of the prism that reflects the light to a light exiting surface of the prism.

According to another feature of the present invention, all of the above mentioned features are incorporated in a plastic prism that can be readily molded to provide an economical alternative to prior known lighting systems, such as those using incandescent light bulbs. The inventive lighting system requires a small amount of power to operate, provides a low operational temperature, is reliable and durable, and vibration resistant. The inventive lighting system can be retrofitted for existing appliance models.

According to the principles of the present invention, by using the unique combination of LEDs with the novel prism designs, lighting colors and lighting patterns can be tailored for desired appearance.

Other features and advantages of the invention will become apparent to those skilled in the art upon review of the following detailed description, claims and drawings in which like numerals are used to designate like features.

Figure 1:
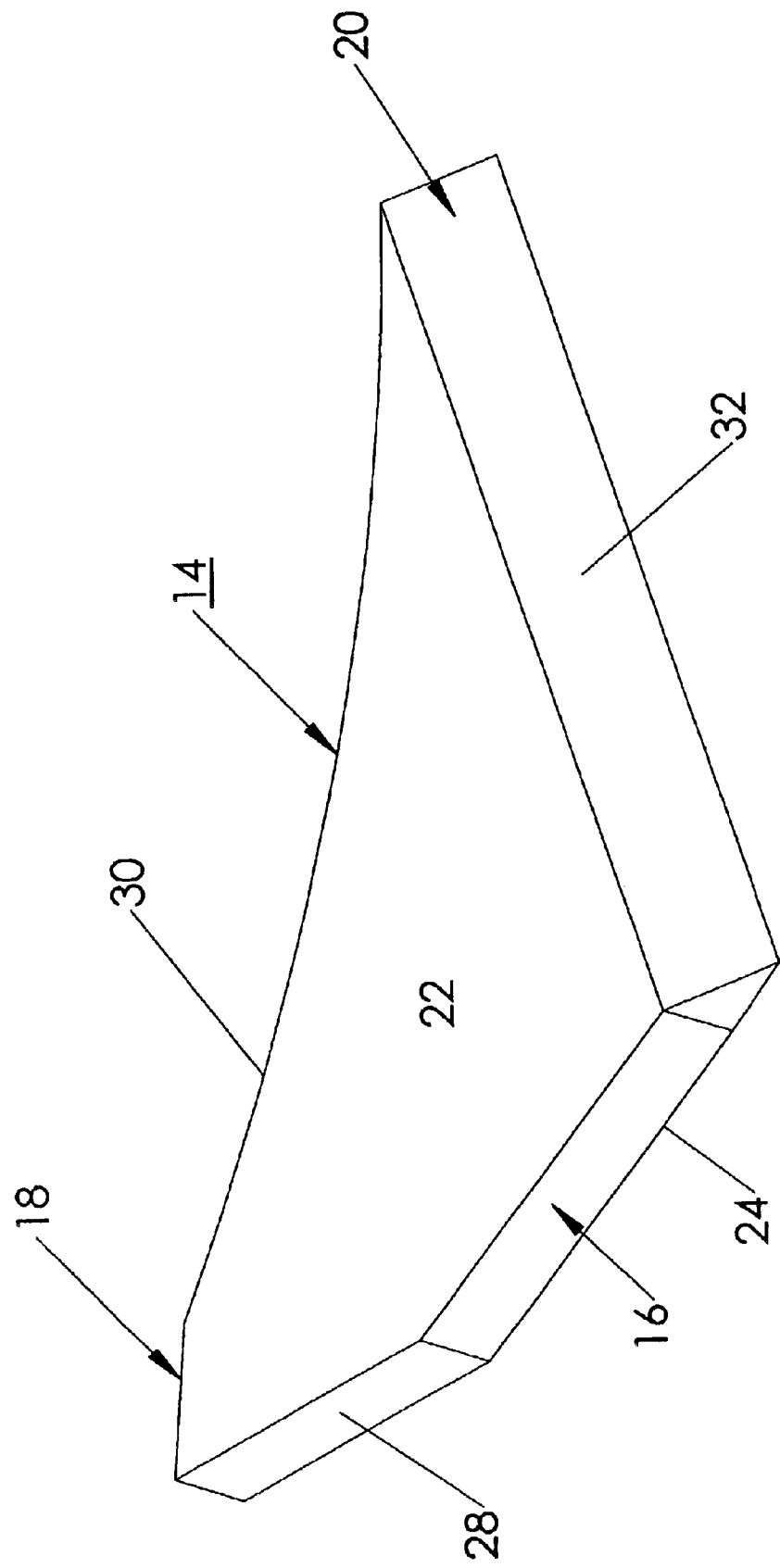
FIG. 1 is a perspective view of one embodiment of a prism for a lighting system according to the present invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE PREFERRED EMBODIMENTS

Figure 2:
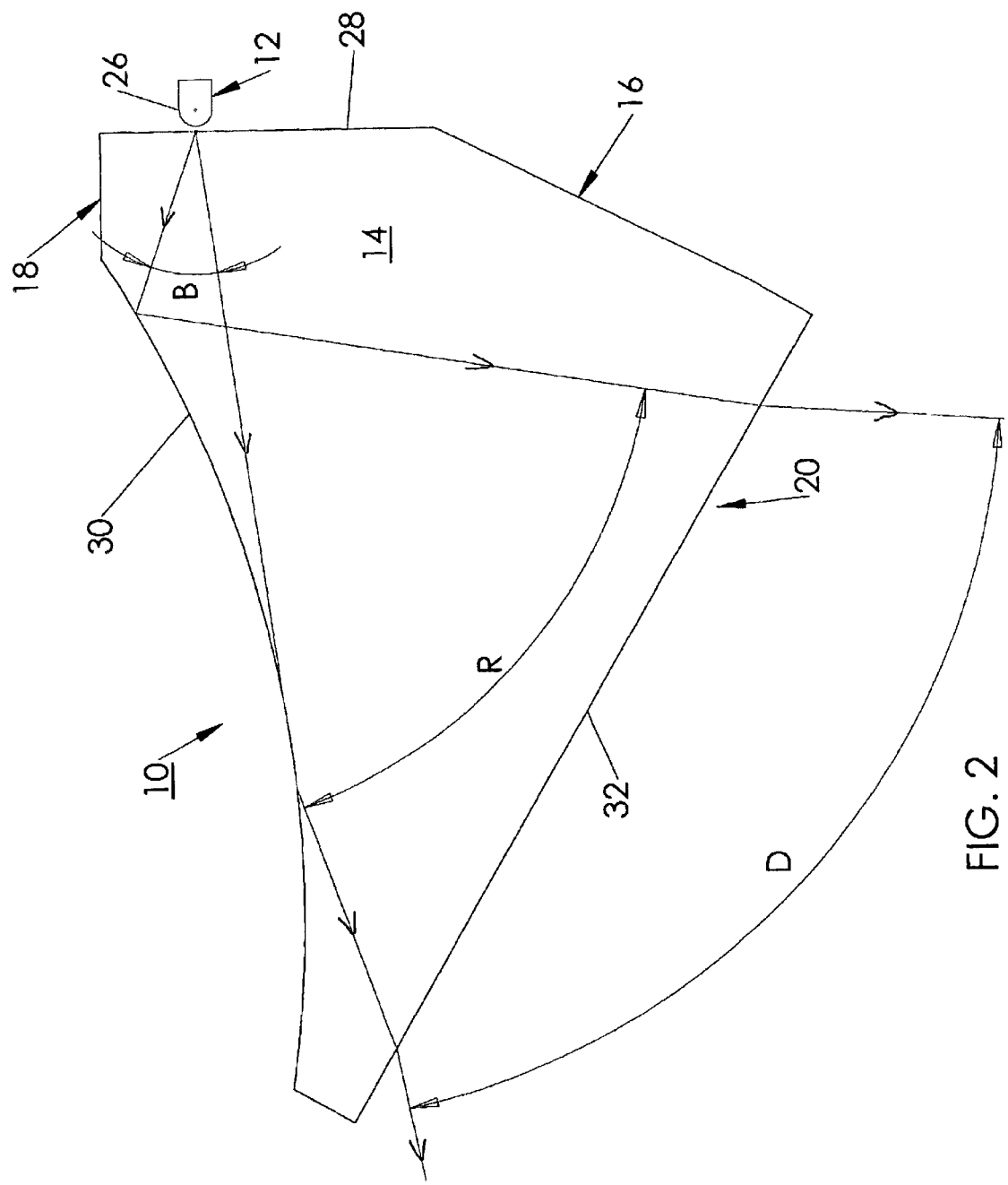
FIG. 2 is an illustration of the LED light traveling through the prism depicted in FIG. 1.

FIG. 2 illustrate a lighting system 10 according to the present invention. The lighting system 10 transmits light from light source 12 through a prism 14. Prism 14 has a generally triangular like shape having three sides 16, 18, and 20 (see also FIG. 1). Prism 14 is preferably formed of a clear glass or plastic material having a high transparency value for transmitting light through the prism between its spaced parallel plate surfaces 22 and 24 (FIG. 1). Alternatively, the prism 14 can be made of other suitable materials according to the principles of the present invention.

The preferred light source 12 used in lighting system 10 is preferably small in size, reliable and durable, with low energy usage and low heat generation. Conventional LED lamps have been found to be particularly suitable for achieving the desired light source characteristics of the present invention. When designing a lighting system for many appliance applications requiring the illumination of a large expanse, the major shortcoming of using LED lamps is that they project a narrow beam of light. The present invention overcomes this disadvantage by combining the LED with a unique prism design, which will be explained in further detail by reference to the illustration of FIG. 2.

FIG. 2 shows an LED 26 positioned along the light receiving edge 28 of side 16 at a location that causes its cone shaped beam B to travel through the prism until the light strikes the convex edge surface 30 that is formed intermediate of sides 18 and 20. In accordance with the known principles of light reflection, the radius of curvature of the convex edge surface 30 is preferably selected to have a critical angle less than the angle of incidence of the light beam B.

The reflected beam R is directed towards side 20 of the prism 14, and passes through its light exiting edge surface 32 to provide a substantially uniform light distribution D, which has a substantially greater expanse as compared to the LED's beam B. This uniform light distribution D has been found to provide sufficient illumination to function as the headlight of a household vacuum cleaner or light up a surface of a wall behind an appliance, such as a stove.

When using the lighting system of this invention, it has been found useful to shape the light exiting edge surface 32 to enhance the desired lighting feature. For example in the design of a lighting system for a vacuum cleaner, the light exiting edge surface 32 can be chamfered as depicted in FIG. 1, to cause the light distribution pattern to be downwardly directed in order to illuminate the floor area directly in front of the vacuum cleaner.

In the design of a lighting system that needs a uniform light distribution of much greater expanse than that provided by an LED, the radius of curvature of the convex edge surface 30 is important since it is the reflection off this surface that determines the expanse of the uniform light distribution D. It has been found through experimentation that an optimum radius is approximately five inches for certain applications, such as, for example, for use with vacuum cleaners to illuminate the floor directly in front of the vacuum cleaner, or illuminate a portion of a wall behind a stove.

Figure 4:
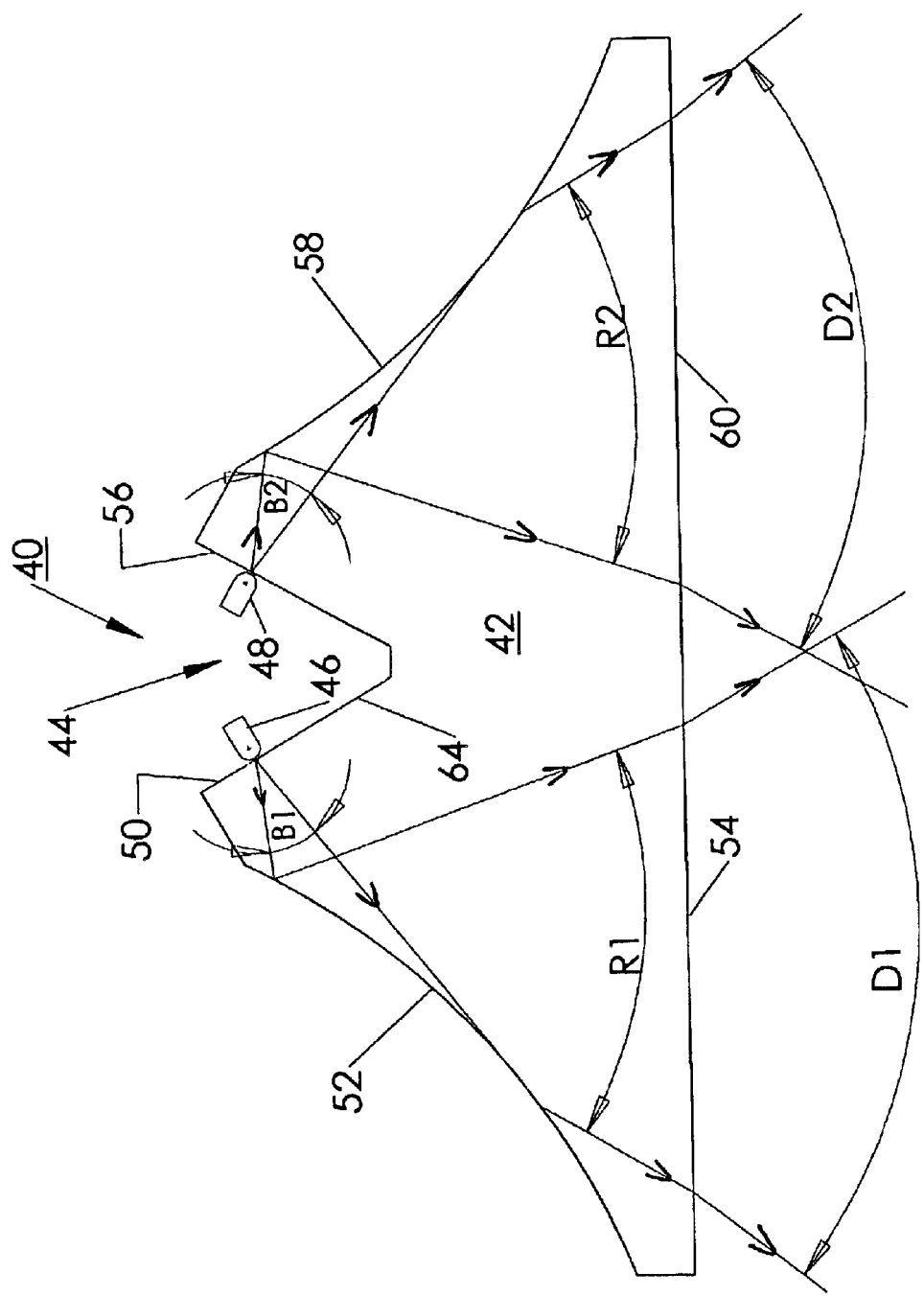
FIG. 4 is an illustration of the light from two LEDs traveling through the prism depicted in FIG. 3.

With reference to FIG. 4, there is shown another aspect of the present invention. In designing some lighting systems for appliances using the principles of this invention, there is a need to provide a greater expanse of light than can be obtained from the lighting system illustrated in FIGS. 1 and 2. The lighting system 40 depicted in FIG. 4 is capable of providing a substantially uniform light distribution that has practically twice the expanse as that for the lighting system 10 of FIGS. 1 and 2. By comparing the illustrations of FIGS. 2 and 4, it will be seen that prism 42 in FIG. 4 is, in essence, the combination of the prism 14 of FIG. 2 with a mirror image of prism 14. It will also be appreciated by comparing FIGS. 2 and 4 that the light source 44 for lighting system 40 employs two LEDs 46 and 48.

From the previous description, it will be appreciated that LED 46 is located near a first light receiving edge surface 50 at a position to direct its beam B1 to the first convex curved edge surface 52, where the radius of curvature of the convex edge surface 52 is selected to have a critical angle less than the angle of incidence of light beam B1. The reflected beam R1 is directed towards light exiting edge surface 54 and passes through surface 54 to provide uniform light distribution D1. Likewise, LED 48 is located near a second light receiving edge surface 56 at a position to direct its beam B2 to the second convex edge surface 58, where the radius of curvature of the second convex edge surface has a critical angle less than the angle of incidence of light beam B2. The reflected beam R2 is directed towards light exiting edge surface 60 and passes through surface 60 to provide uniform light distribution D2.

It will be appreciated from the FIG. 4 illustration that uniform light distribution D1 and D2 combine a short distance beyond light exiting edge surfaces 54 and 60 to provide a uniform light distribution that is almost double the expanse of that for the system of FIG. 2.

Figure 3:
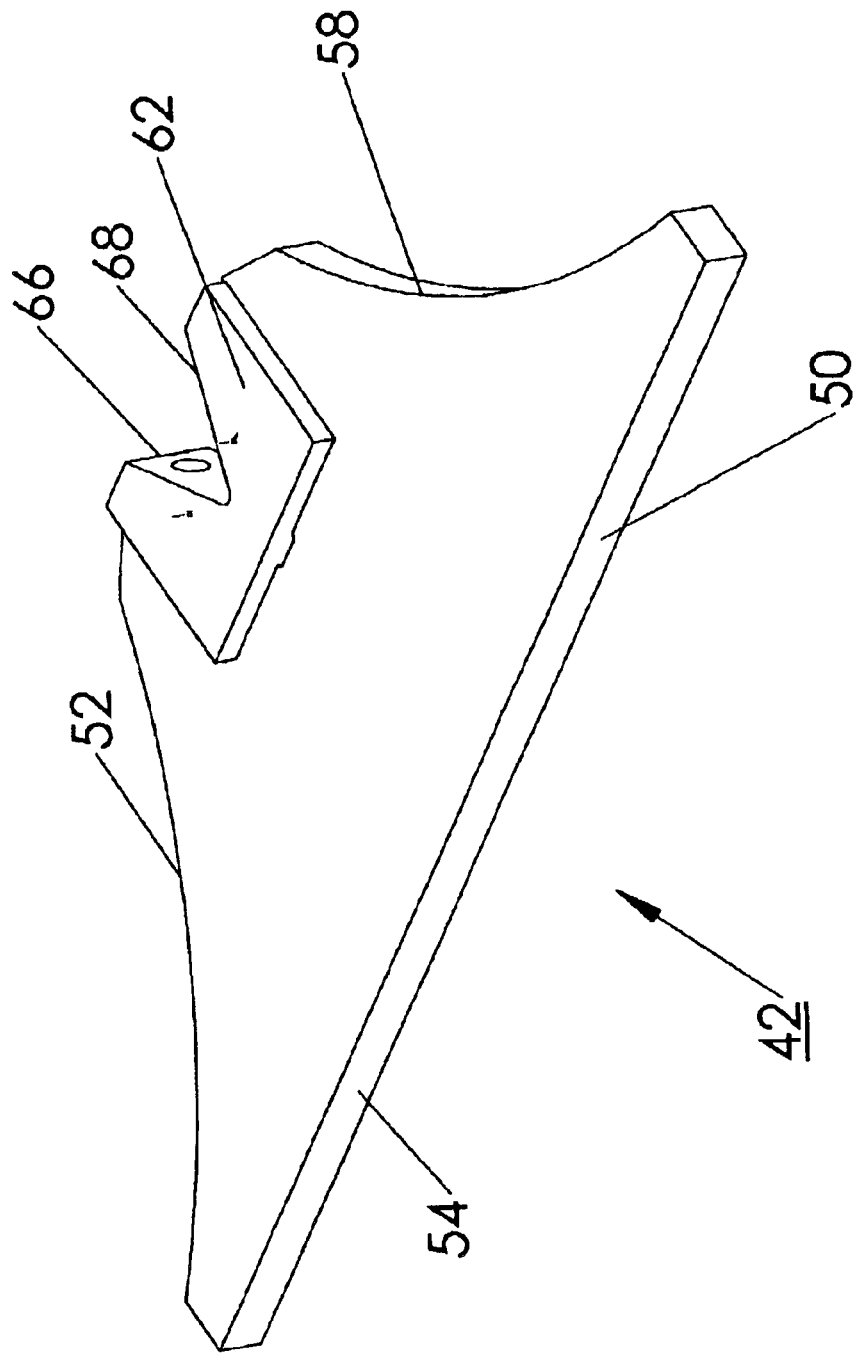
FIG. 3 is a perspective view of another embodiment of a prism for a lighting system according to the present invention.

A perspective view of the light prism 42 of FIG. 4 is depicted in FIG. 3. As with the prism of FIG. 1, this prism is preferably made of a clear plastic having a high transparency value that can be molded. Other suitable materials can be used. There is also shown in FIG. 3, an LED holder 62 that slides into the V-groove 64 (FIG. 4) of prism 42. LED holder 62 is configured to hold the LEDs 46 and 48. As shown, LED holder 62 includes two apertures 66 and 68 for receiving LEDs 46 and 48, respectively. LEDs 46 and 48 are secured in the apertures 66 and 68, respectively, in a manner that positions the front of the LEDs against, or at least in close proximity to, the light receiving edge surfaces 50 and 56, respectively. In the preferred embodiment, the LEDs are positioned in a generally perpendicular orientation with respect to the edge surfaces. The orientation of the LEDs with respect to the edge surfaces may vary depending on the desired results. In any event, by using LED holder 62, the LEDs can always be placed in the same exact location along the light receiving edge surfaces and can always be held in the same angular orientation (substantially perpendicular to the light receiving edge surfaces).

Figure 7:
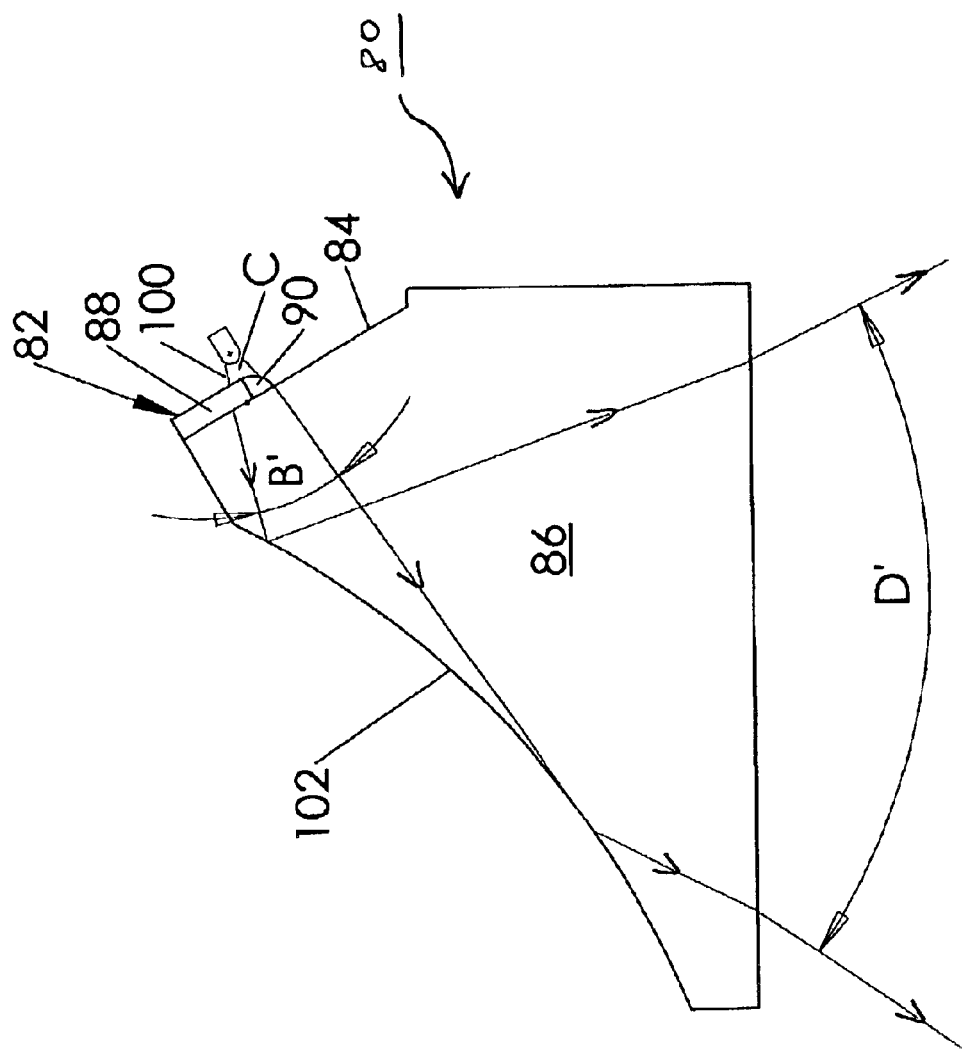
FIG. 7 is an illustration of the light from the LED traveling through the lens and prism of FIG. 5.

There is illustrated in FIG. 7 yet another aspect of the present invention. In the lighting systems thus described, although substantially uniform light distributions are created, given the general nature of reflective light, it was observed that these lighting systems can generally create alternating lighter and darker bands across the uniform light distribution expanse. In some applications, this visual effect may be less than desired, for example, when the uniform light distribution is intended to shine on a wall surface, such as that found behind a stove. The lighting system 80 depicted in FIG. 7 is capable of greatly diminishing the differences between the lighter and darker bands of the uniform light distribution expanse and thereby present a more pleasing visual effect of the uniform light distribution expanse, when such an effect is desired.

The darker bands of the uniform light distribution that can be generated by the lighting systems of FIGS. 2 and 4 are greatly diminished by the addition of a complex lens 82 that is mounted near the light receiving edge surface 84 of prism 86 depicted in FIG. 7. Prism 86 operates on the same design concepts and principles previously explained with reference to prism 14 (FIGS. 1 and 2) and prism 42 (FIGS. 3 and 4).

Figure 6:
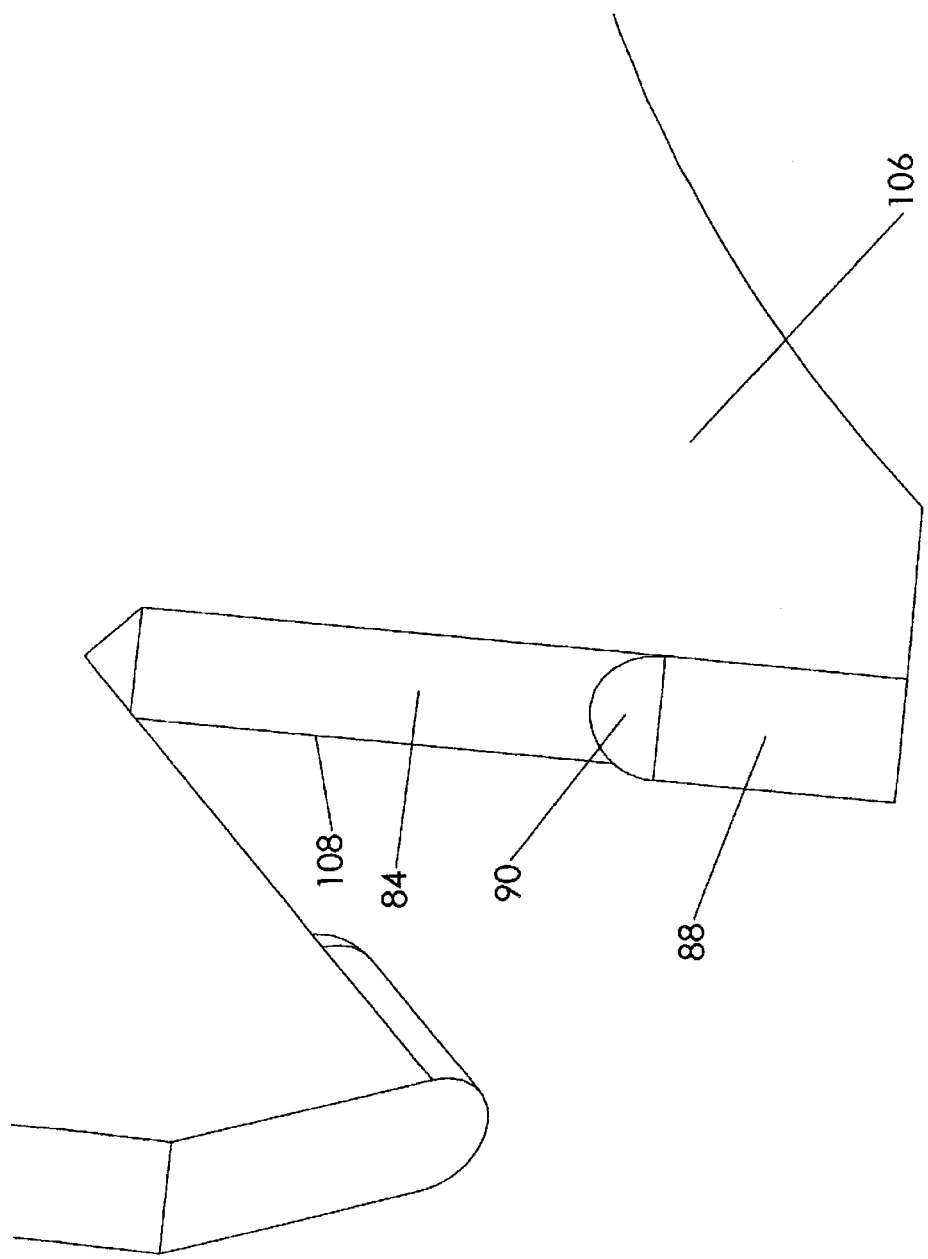
FIG. 6 is a perspective view of the complex lens incorporated in the prism shown in FIG. 5.

Referring to FIG. 7, in conjunction with FIG. 6, complex lens 82 is shown as having a generally half-cylindrical portion 88 and a generally spherical portion 90 positioned at one end of portion 88. The diameter of the half-cylindrical portion 88 is preferably the same length as the thickness of the light receiving edge surface 84.

Figure 5:
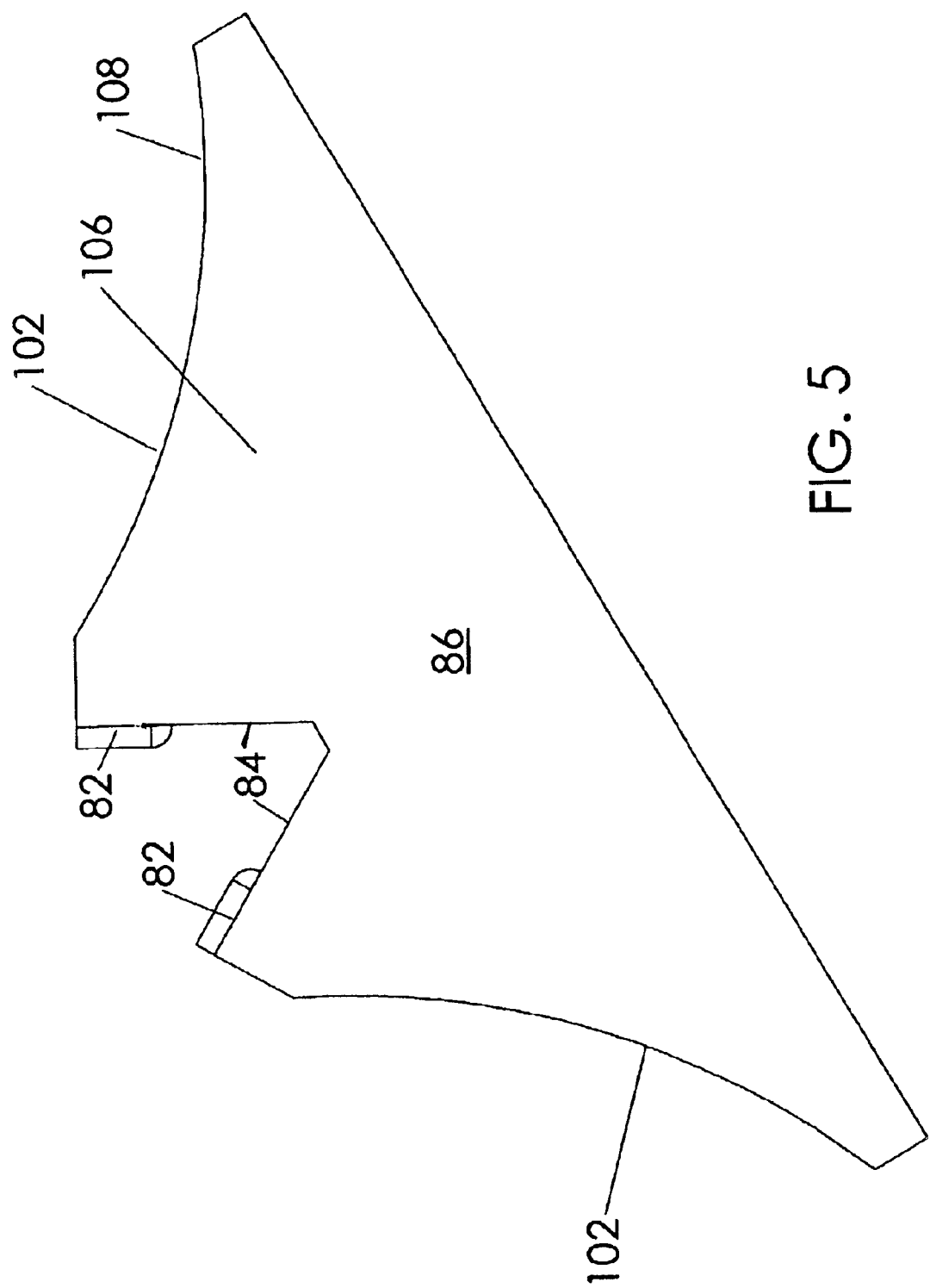
FIG. 5 is a perspective view of the lens and prism for another embodiment of a prism for a lighting system according to the present invention.

As depicted in FIGS. 6 and 7, as well as in FIG. 5, the complex lens 82 is located on the light receiving edge surface 84 in a contiguous relation in such a manner that the cone-shaped beam C from LED 100, which is spaced away from lens 82, will be focused near the portion of the complex lens 82 where the half-cylindrical portion 88 and spherical portion 90 merge together. The spacing and location of LED 100 is set to have its cone-shaped beam C be approximately centered on the boundary of the half-cylindrical portion 88 and spherical portion 90.

The portion of the LED's cone-shaped beam C striking the spherical portion 90 will bend towards the light beam B' traveling through prism 86 to the convex edge surface 102. Without the addition of the spherical portion 90, the outer portion of the cone-shaped beam C would not find its way to surface 102 to assist in creating the uniform light distribution D'.

The major portion of LED's cone shaped beam C passes through the semi-cylindrical portion 88 which functions to keep the light focused through prism 86 and to greatly reduce the amount of light rays bouncing between the parallel plate surfaces 106 and 108 of prism 86 depicted in FIG. 7.

The net effect of using the complex lens 82 in association with prism 86 is to generate a uniform light distribution D' which has a greater intensity and, perhaps more importantly, has virtually eliminated the sometimes objectionable alternating lighter and darker bands to create a more pleasing visual lighting effect when the uniform light distribution D' is shined on a surface, such as a wall surface behind a stove.

The complex lens 82 can be made of the same material as the prism 86 and can be conveniently manufactured by simultaneously molding the lens 82 and prism 86 of a clear plastic material, such as an acrylic or styrene material having a high transparency value.

Whereas various aspects of the present invention have been illustrated and described in detail, it will be apparent that various changes may be made in the disclosed embodiments without departing from the spirit and scope of the invention. For example, the edge surface of the light exiting surface for prisms 14, 42 and 86 can be shaped to produce different uniform light distribution patterns. One such variation has been previously described by chamfering the edge surface to direct the light upwards or downwards (see FIG. 1). Another possibility is to shape the light exiting edge surface to have a scalloped shape as depicted on the light exiting edge surface 110 of prism 112 in FIG. 8.

Figure 8:
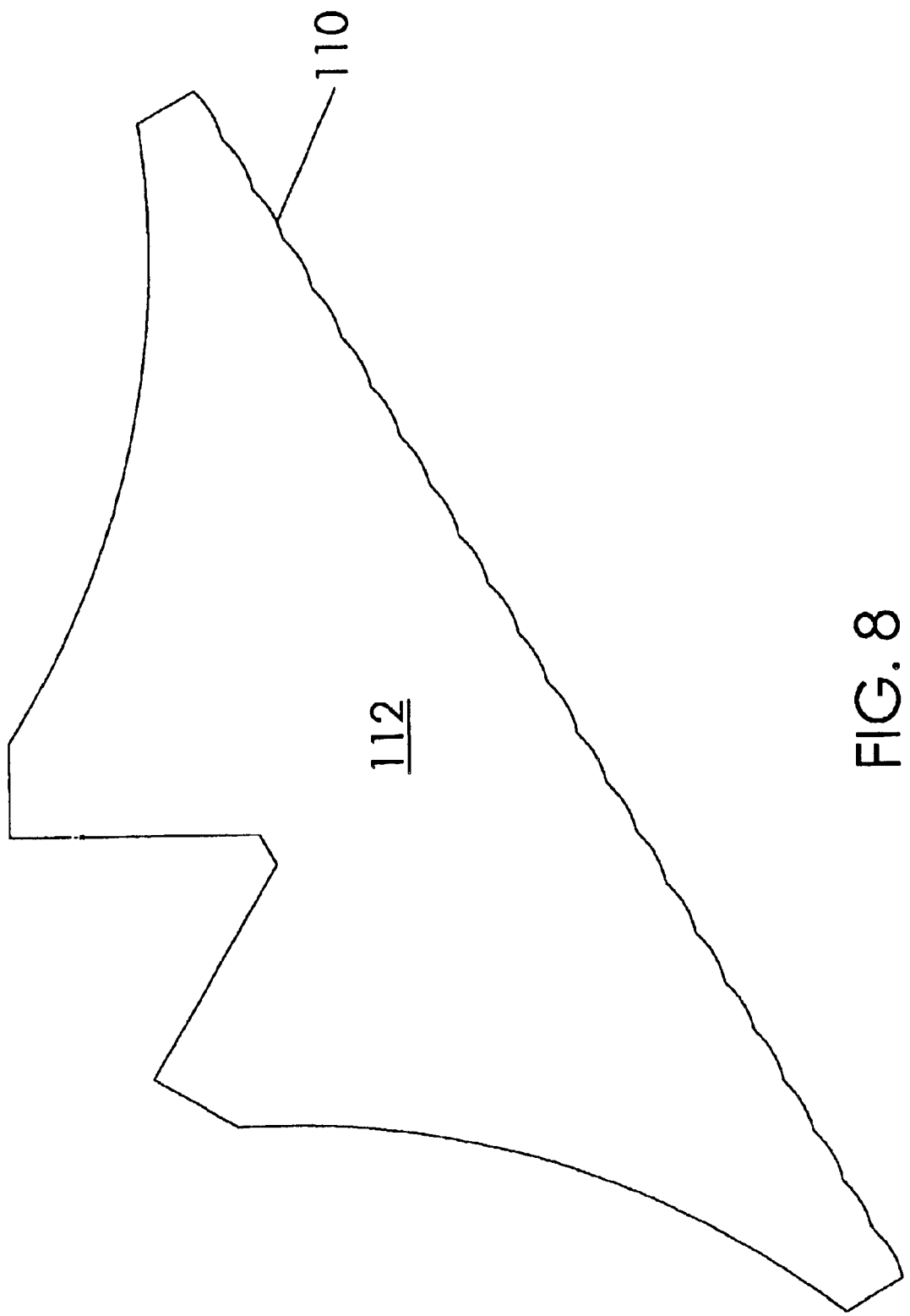
FIG. 8 is a perspective view of a modified prism designed to create a particular light pattern.
Figure 9:
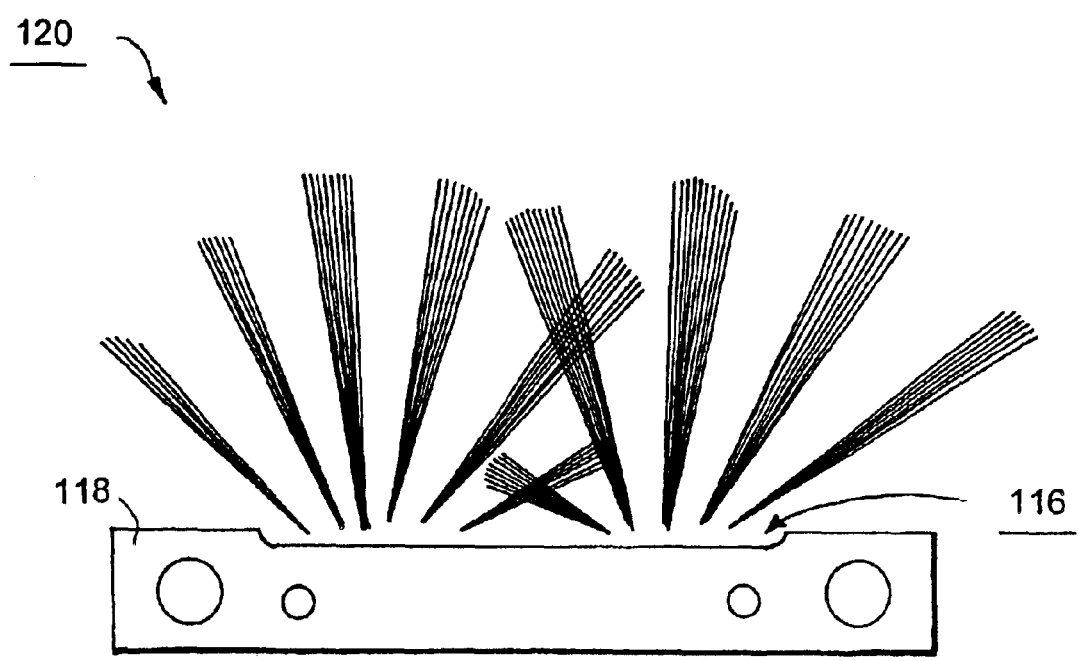
FIG. 9 is an illustration of the particular light pattern created by the prism of FIG. 8 emanating from an appliance aperture.

FIG. 9 schematically depicts the visually pleasing palm leaf pattern that results from the scalloped-shaped edge surface 110 of FIG. 8. The palm leaf light pattern is shown in FIG. 9 as exiting from an elongated surface 116 of an appliance display panel 118 and being directed to appear on a wall surface 120 above the elongated surface 116.

It should be understood that although the invention has been primarily described for use in a vacuum cleaner or stove, the invention is capable of use in any number of other suitable applications, and the use of a vacuum cleaner and a stove in combination with the present invention is merely intended to provide examples of such applications.

It should also be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

Various features of the invention are set forth in the following claims.

What is claimed is:

1. A lighting system comprising:
   a prism having a light receiving edge surface, a curved edge surface having a convex shape in relation to the light receiving edge surface, the curved edge surface being spaced from the light receiving edge surface, and a light exiting edge surface spaced apart from the curved edge surface and the light receiving edge surface; and
   a light source focused to shine a beam of light through the light receiving edge surface at a position that causes the beam of light to travel through the prism and strike the curved edge surface at a proper angle so as to be reflected in such a manner to provide a substantially uniform light distribution from the light exiting edge surface.

2. A lighting system as defined by claim 1, wherein the light source is an LED.

3. A lighting system as defined by claim 1, wherein the curved edge surface has a curvature of about a five-inch radius.

4. A lighting system as defined by claim 1, wherein the light exiting edge surface is of a substantially chamfered shape.

5. A lighting system as defined by claim 1, wherein the light exiting edge surface is of a substantially scalloped configuration.

6. A lighting system as defined by claim 1, further comprising a second light source, and wherein the prism has a second light receiving edge surface, a second curved edge surface spaced from the second light receiving edge surface, and a second light exiting edge surface spaced apart from the second curved edge surface and the second light receiving edge surface, wherein the second light source is focused to shine a beam of light through the second light receiving edge surface at a position that causes the beam of light to travel through the prism and strike the second curved edge surface at a proper angle so as to be reflected in such a manner to provide a substantially uniform light distribution from the second light exiting edge surface.

7. A lighting system as defined in claim 6, wherein the light exiting edge surface and the second light exiting edge surface are adjacently disposed in a manner to provide a substantially single uniform light distribution a short distance beyond the two light exiting edge surfaces.

8. A lighting system as defined by claim 6, wherein both light sources are LEDs.

9. A lighting system as defined by claim 6, wherein each of the curved edge surfaces has a curvature of about a five-inch radius.

10. A lighting system as defined by claim 1, further comprising a lens adjacent to the light receiving edge surface in line with the beam of light from the light source, wherein the lens is configured to cause the beam of light to travel substantially between a top plate and a bottom plate of the prism so as to minimize the amount of light that escapes from the top plate or bottom plate.

11. A lighting system as defined by claim 10, wherein the lens has a semi-cylindrical curved shape.

12. A lighting system as defined by claim 10, wherein the lens and the prism are made of a molded plastic material having a high transparency value for the color of light being transmitted through it, and wherein the lens and the prism are molded together as a single unit.

13. A lighting system as defined by claim 1, further comprising a complex lens having a semi-cylindrical lens portion and a spherical lens portion, the complex lens being disposed adjacent to the light receiving edge surface in a position that the being from the light source strikes the complex lens in a manner that a portion of the beam is received by the spherical lens portion which causes that portion of the beam to bend towards and to combine with the remaining portion of the beam that emanates from the semi-cylindrical lens portion.

14. A lighting system as defined by claim 13, wherein the complex lens and the prism are made of a molded plastic material having a high transparency value for the color of light being transmitted through it, and wherein the complex lens and the prism are molded together as a single unit.

15. A lighting system as defined by claim 1, wherein the prism is made of a molded plastic material having a high transparency value for the color of light being transmitted through it.

16. A lighting system comprising:

a prism having a first portion including a first light receiving edge surface, a first curved edge surface spaced from the first light receiving edge surface, and a first light existing edge surface spaced apart from the first curved edge surface and the first light receiving edge surface, and a second portion adjacent to the first portion such that the second portion can be considered a mirror image of the first portion, wherein the second portion includes a second light receiving edge surface, a second curved edge surface spaced from the second light receiving edge surface, and a second light existing edge surface spaced apart from the second curved edge surface and the second light receiving edge surface;

a first light source focused to shine a first beam of light through the first light receiving edge surface at a position that causes the first beam of light to travel through the prism and strike the first curved edge surface at an angle of incidence that is greater than the critical angle so as to be reflected in such a manner to provide a first substantially uniform light distribution from the first light exiting edge surface;

a second light source focused to shine a second beam of light through the second light receiving edge surface at a position that causes the second beam of light to travel through the prism and strike the second curved edge surface at an angle of incidence that is greater than the critical angle so as to be reflected in such a manner to provide a second substantially uniform light distribution from the second light exiting edge surface;

wherein the first light exiting edge surface and the second light exiting edge surface are adjacently disposed in such a manner that portions of the first and second substantially uniform light distributions combine together a short distance beyond the two light exiting edge surfaces to effectively provide a single substantially uniform light distribution pattern;

a first complex lens having a first semi-cylindrical lens portion and a first spherical lens portion, the first complex lens being disposed adjacent to the first light receiving edge surface in a position that the beam from the first light source strikes the first complex lens in a manner that a portion of the first beam is received by the first spherical lens portion which causes that portion of the first beam to bend towards and to combine with the remaining portion of the first beam that emanates from the first semi-cylindrical lens portion; and a second complex lens having a second semi-cylindrical lens portion and a second spherical lens portion, the second complex lens being disposed adjacent to the second light receiving edge surface in a position that the beam from the second light source strikes the second complex lens in a manner that a portion of second beam is received by the second spherical lens portion which causes that portion of the second beam to bend towards and to combine with the remaining portion of the second beam that emanates from the second semi-cylindrical lens portion.

17. A lighting system as defined in claim 16, wherein the first and second light sources are LEDs, and wherein the system further includes an LED holder for strategically placing the LEDs with respect to the associated light receiving edge surface.

18. A lighting system as defined by claim 16, wherein each curved edge surface is convex with respect to its associated light receiving edge surface.

19. A lighting system as defined by claim 16, wherein the prism and the complex lens' are made of a molded plastic material having a high transparency value for the color of light being transmitted through it, and wherein the prism and the complex lens' are molded together as a single unit.

20. A lighting system comprising:

a prism having a light receiving edge surface, a curved edge surface spaced from the light receiving edge surface, and a light exiting edge surface spaced apart from the curved edge surface and the light receiving edge surface;

a light source focused to shine a beam of light through the light receiving edge surface at a position that causes the beam of light to travel through the prism and strike the curved edge surface at a proper angle so as to be reflected in such a manner to provide a substantially uniform light distribution from the light exiting edge surface; and a lens adjacent to the light receiving edge surface in line with the beam of light from the light source.

21. A lighting system as defined by claim 20, wherein the lens is a complex lens having a semi-cylindrical lens portion and a spherical lens portion, the complex lens being disposed adjacent to the light receiving edge surface in a position that the beam from the light source strikes the complex lens in a manner that a portion of the beam is received by the spherical lens portion which causes that portion of the beam to bend towards and to combine with the remaining portion of the beam that emanates from the semi-cylindrical lens portion.

* * * * *